(12) United States Patent
Van Schaftingen et al.

(10) Patent No.: US 6,168,750 B1
(45) Date of Patent: Jan. 2, 2001

(54) SYSTEM AND METHOD FOR PREFORMING AN EXTRUDED PARISON

(75) Inventors: Jules-Joseph Van Schaftingen, Wavre; Serge Dupont, Vilvoorde, both of (BE)

(73) Assignee: Solvay, S.A. (Societe Anonyme), Brussels (BE)

( * ) Notice: Under 35 U.S.C. 154(b), the term of this patent shall be extended for 0 days.

(21) Appl. No.: 09/222,721

(22) Filed: Dec. 29, 1998

(30) Foreign Application Priority Data

Dec. 30, 1997 (FR) .................................................. 97 16828

(51) Int. Cl.[7] ...................................................... B29L 49/04
(52) U.S. Cl. ...................... 264/542; 264/209.3; 425/392; 425/532; 425/534
(58) Field of Search ............................ 198/629; 264/540, 264/542, 209.3; 425/528, 532, 534, 522, 392, 363, 36 YR

(56) References Cited

U.S. PATENT DOCUMENTS

| | | | |
|---|---|---|---|
| 3,274,313 | * 9/1966 | Harp, Jr. ............................ | 264/209.3 |
| 4,204,497 | * 5/1980 | Lever .................................... | 118/634 |
| 4,738,612 | * 4/1988 | Kikuchi et al. ....................... | 425/532 |
| 4,971,544 | 11/1990 | Schneeberger ....................... | 425/528 |
| 5,464,635 | 11/1995 | Geiger ................................. | 425/532 |
| 5,814,269 | * 9/1998 | Geiger ................................. | 425/534 |

FOREIGN PATENT DOCUMENTS

| | | |
|---|---|---|
| 0256442A1 | 2/1988 | (EP) . |
| 57-178726 | * 11 1982 | (JP) ..................................... 264/540 |
| 96/28295 | 9/1996 | (WO) . |

* cited by examiner

*Primary Examiner*—Robert Davis
(74) *Attorney, Agent, or Firm*—Venable; Martin V. Schneller

(57) ABSTRACT

The invention relates to a system for preforming an extruded plastics parison including a nonplanar conveyor belt. It also relates to a method for preforming an extruded parison, including a step during which the parison is deposited on a conveyor belt. The conveyor belt is not planar. This step may be accompanied by a step in which the parison undergoes transverse deformation. The invention also relates to a method of manufacturing at least one article, including such a preforming step.

8 Claims, 1 Drawing Sheet

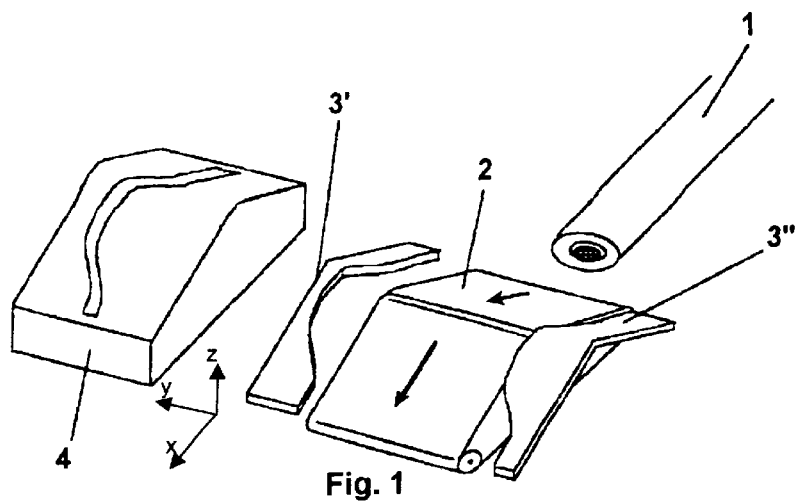
Fig. 1
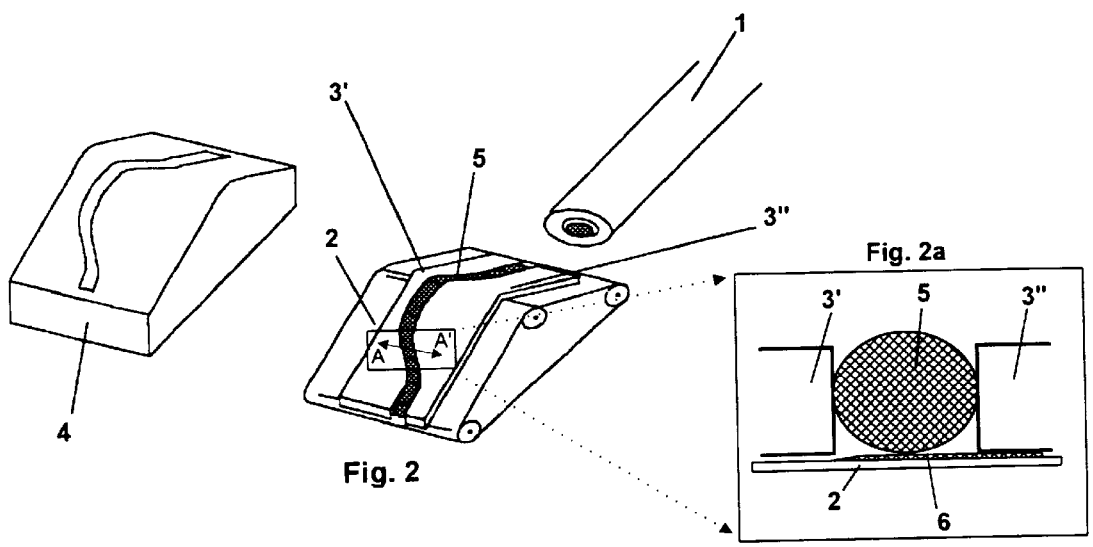
Fig. 2
Fig. 2a
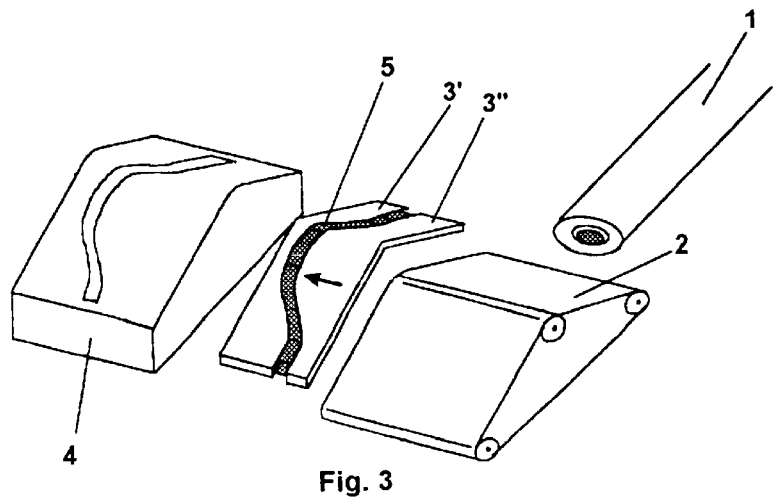
Fig. 3

SYSTEM AND METHOD FOR PREFORMING AN EXTRUDED PARISON

The present invention relates to a system and a method for preforming an extruded parison by means of which it is possible to manufacture a moulded article of complex three-dimensional geometry.

Several moulding methods by means of which it is possible to manufacture moulded articles from polymer resin and having a complex three-dimensional geometry are known. Such articles may for example have a succession of segments each oriented in a different direction.

Such articles have many applications. Examples of these that may be mentioned, relating to the automotive industry in particular, are filling sleeves for fuel tanks and hoses for ventilation or for conveying various kinds of fluids, the positioning and routing of which can be dictated by the surrounding geometry.

The difficulties encountered during manufacture of such articles arise from their complex spatial structures. In particular, the parison must be introduced safely into the mould, taking particular care to avoid loss of material and excessive local stretching.

One solution is to deposit the parison directly in one of the mould sections whose opening is face uppermost. This method requires that either the said mould section or the extrusion head be made to follow a complex three-dimensional movement reproducing the shape of the article to be moulded. The weight of the equipment required is usually very great, so this method has few advantages, either in terms of engineering or economics.

In order to solve this problem, several methods involve preforming the parison before introducing it into the mould, i.e. giving it a shape adapted to the shape of the mould impression. This preforming process makes it unnecessary to employ a mobile mould or extrusion head. Only the relatively light equipment that carries out the preforming process is mobile.

Patent application WO-A1-9628295 discloses such a method. The parison, which is intended to produce a tubular article, is deposited on a horizontal planar conveyor belt travelling at approximately the extrusion speed. After closure at one end, preblowing, closure at the other end and stoppage of the belt, the parison is then deformed in the horizontal plane only, using a tool with two parts that work together to form it laterally. The parison thus acquires a shape corresponding to the projection in the horizontal plane of the shape of the article to be produced. After this step of preforming in two directions, the conveyor belt is moved away and the parison is brought by the preforming tool vertically over the lower section of the mould. The retraction of the two parts of the preforming tool causes the parison to drop into the mould, which is then closed.

The above method has the advantage of not requiring precise synchronization of the speed of extrusion with the movement of the preforming equipment and can be carried out equally satisfactorily with a vertical extrusion head or with a horizontal head. However, it still has certain disadvantages. One of the main problems is that the preforming is effected in only the two directions of the plane of the conveyor belt. As the mould impression usually includes segments whose orientation is outside this plane, these segments may, when the preform is placed in the mould, bring about large, non-uniform deformations of the material prior to moulding, and therefore, for example, bring about a lack of uniformity of wall thickness. Another problem is that the preform, which is necessarily contained in a plane prior to being placed in the mould, must be released from a certain height, a height which is greater and less uniform in proportion as the article to be produced possesses a large component outside this plane. This large dropping height inevitably results in a less precise positioning the preform in the mould, and therefore results in articles with less reproducible characteristics.

The subject of the present invention is therefore a system that makes preforming simple to carry out and that does not have the abovementioned disadvantages.

Consequently, the invention relates to a system for preforming an extruded plastics parison, which is characterized in that it comprises a nonplanar conveyor belt.

Within the context of the present invention, the term "preforming" means any operation or series of operations intended to modify the geometry of the parison, between the moment in which it is extruded and the moment in which it is introduced into a moulding tool.

Any plastics material can be used to make the parison used within the scope of the invention. It makes no difference whether it is a thermosetting resin or a thermoplastic resin. The parison preferably consists essentially of thermoplastic resin. The said thermoplastic resin may include one or more polymers. These polymers may include homopolymers, copolymers or mixtures of these. It is preferable for the polymer to be a polyolefin. It is more preferable for the polyolefin to be a polyethylene. Excellent results have been obtained with high-density polyethylene.

The plastics material may also contain any ordinary appropriate additive, such as fillers, reinforcing materials, stabilizers, lubricants or combinations of these additives.

It makes no difference whether the parison is single-layer or multilayer.

It may also be solid or possess a hollow core.

In the case of a multilayer parison with a hollow core, one of the layers may be composed of, for example, a resin that has a barrier action selected for the application envisaged.

The parison may be extruded by any technique known to those skilled in the art. Extrusion may e.g. be continuous, discontinuous, with use of an accumulator, or sequential. The extrusion head may be horizontal or vertical. Extrusion can also be carried out using constant parameters or parameters that are programmable in the course of time.

If the extrusion parameters are to be programmable, it is advantageous to be able to vary the section of the parison and/or, if appropriate, the thicknesses of the different layers.

Very good results have been obtained with continuous extrusion, with an approximately horizontal extrusion head, and, preferably, programming in the course of time of the parison wall thickness.

The conveyor belt used may adopt any configuration known to those skilled in the art, provided that at least a part of its surface intended to take the parison is not planar; i.e. the longitudinal profile of the conveyor belt, between its furthest upstream support and its furthest downstream support, is not approximately rectilinear.

In the present context the description "approximately rectilinear" is applied to a profile in which no point deviates from the straight line segment that tangentially joins the supports at the upstream and downstream extremities by more than 2% of the length of this segment, and preferably by not more than 1% (hence ignoring any curvature of the conveyor belt due to these supports).

The invention gives very good results when this deviation is more than 10% and in particular more than 20%. The profile may be of any possible geometry, but will preferably approach the corresponding profile of the mould impression. Such a profile may include, for example, two or more planes and/or one or more curves. This nonplanar arrangement makes it possible to minimize, when the parison is introduced into the mould, both the stretching imposed on the said parison and the height through which it has to drop.

Any technique known to those skilled in the art may be employed to create the desired longitudinal profile of the conveyor belt. The simplest technique is to run the conveyor belt, between its two ends, over one or more continuous or discontinuous intermediate transverse supports (rotary cylinders for example) lying outside the plane defined by the endmost supports. Other techniques use, e.g., series of rollers at the sides.

The material of the conveyor belt may be of any kind compatible with the material and temperature of the parison and will preferably be chosen, in a known manner, so as to limit the risk of adhesion of the parison to its surface.

The conveyor belt is often an endless belt. Alternatively it may be, for example, a belt that is wound off one mandrel onto another.

One of the main fields of application of the preforming system in accordance with the invention is the manufacture of three-dimensional articles. The system according to the invention therefore comprises in addition at least one transverse parison-preforming tool.

This tool may be of any kind known to those skilled in the art. It may take the form of, for example, templates that grip the parison laterally.

Advantageously, at least one transverse preforming tool conforms at least partly to the longitudinal profile of the conveyor belt. At least one preforming tool is preferably nonplanar. With particular advantage, at least one preforming tool is nonplanar and conforms at least partly to the longitudinal profile of the conveyor belt.

Equally advantageously, the transverse parison-preforming tool includes a system that enables it to support and transport the parison, once the latter has been preformed. The transverse preforming tool also constitutes, in this case, a clamp for transferring the parison to and positioning it in a moulding tool. Such a system may be of any kind compatible with the transverse preforming tool.

One particular example of a system that can be employed includes a projecting lip (continuous or otherwise) along the lower edge of each of the two parts of the transverse preforming tool. Each lip extends towards the other part of the transverse preforming tool so that the two lips cooperate to support the parison when the said parts are at their closest approach to each other.

In this version, after the said parison has been transported and positioned above the moulding tool, the two parts of the transverse preforming tool have simply to be separated in order to release the parison, which then drops directly into the moulding tool.

Another system that can be used includes a retractable lower lip connected to one of the parts of the transverse preforming tool.

In order that the parison is not prematurely cooled, the preforming system may optionally be wholly or partly heated.

With the system disclosed above it is a simple matter to carry out a preforming process that does not have the disadvantages of conventional processes.

Consequently, the invention also relates to a method of preforming an extruded plastics parison, comprising a step during which the parison is deposited on a conveyor belt, which is characterized in that the surface of the said conveyor belt is riot planar.

The preforming method according to the invention applies more particularly to the manufacture of three-dimensional articles. The step during which the parison is deposited on the conveyor belt, and in which the parison is preformed in its longitudinal profile, is therefore preferably accompanied by a step of transverse preforming by means of at least one tool.

This tool may be of any kind known to those skilled in the art. It may take the form of, for example, templates that grip the parison laterally.

Advantageously, at least one transverse preforming tool conforms at least partly to the longitudinal profile of the conveyor belt. Equally advantageously, at least one preforming tool is nonplanar. With particular advantage, at least one preforming tool is nonplanar and conforms at least partly to the longitudinal profile of the conveyor belt.

As regards the other characteristics of the preforming method according to the invention, these will be found in the different corresponding characteristics of the system according to the invention.

The preforming method according to the invention can be used to manufacture articles with improved properties, particularly owing to greater control of the deformations of the parison during its introduction into the mould.

Consequently the invention also relates to a method of manufacturing at least one article, comprising a step in which a plastics parison is extruded and a step in which the said parison is moulded, characterized in that it also comprises a preforming step according to the method disclosed above.

Any kind of moulding is possible, e.g. simple moulding or, in the case of a parison with a hollow core, blow moulding.

The article concerned may be of any kind, e.g. a hollow body or a solid body. In the case of a hollow body, it is preferably a tubular pipe, e.g. for carrying various kinds of gases or liquids. More preferably, the tubular pipe is a filling sleeve for a fuel tank.

Within the scope of the method of manufacture according to the invention, it is possible, in order to optimize both the rate of production and the use of the different tools, to use either a plurality of preforming systems and one moulding tool, or one preforming system and a plurality of moulding tools, or a plurality of preforming systems and a plurality of moulding tools. It is preferable to use one preforming system and a plurality of moulding tools.

It can be seen that it is therefore possible to manufacture several different articles simultaneously with different moulds, in the case in which several moulding tools co-exist.

As in the system according to the invention disclosed above, the method of manufacture according to the invention may also comprise the transfer of the parison to and its positioning in the moulding tool. This transfer is defined here as a relative movement of the conveyor belt and/or of the transverse preforming tool and/or of the moulding tool.

The transfer and positioning are preferably carried out by moving the transverse preforming tool.

The preforming system and method according to the invention are illustrated and made explicit, in a non-restrictive manner, in the following Figures.

FIG. 1 shows schematically part of the system according to the invention in a configuration used to perform the first step of the method according to the invention. The Figure also indicates the system of reference axes employed.

FIG. 2 illustrates the same system in another step of the method.

FIG. 2a is a detail view of a section on AA' as marked in FIG. 2.

FIG. 3 illustrates yet another step.

Considering FIG. 1, showing the equipment at a step preceding the extrusion of the parison, this indicates an extrusion head (1) whose axis is contained in the xz plane. The die of the extrusion head is positioned above one end of a conveyor belt (2). The conveyor belt is in this case an endless belt whose upper surface adopts a longitudinal profile (along the x axis of the xz plane) that first ascends and then descends.

The two parts (3', 3"), of a transverse parison-preforming tool are separated in order to expose the conveyor belt. The transverse preforming tool extends here from one end of the conveyor belt to the other (along the x axis) and has a longitudinal profile that conforms to the longitudinal profile of the conveyor belt. When the transverse preforming tool is moved over the conveyor belt, its lower surface therefore comes at all points into the immediate vicinity of the upper surface of the conveyor belt.

In the present case, the transverse preforming tool consists chiefly of a pair of one-piece plates of complementary transverse profiles selected to match the desired transverse profile of the preform.

The moulding tool, here represented by the lower section (4) of a mould, is positioned further away in the direction of the y axis.

The conveyor belt is driven so that its upper surface advances in the direction of the x axis. The parison (5) is extruded and deposited on the surface of the moving conveyor belt. The conveyor belt therefore carries the parison in the direction of the x axis while simultaneously giving it the longitudinal profile defined by the longitudinal profile of the upper surface of the conveyor belt. When the end of the parison reaches the opposite end of the conveyor belt (or optionally any predetermined point before this end), the conveyor belt is stopped and the parison is cut off at the die (by means that are not depicted).

The two parts (3', 3") of the transverse parison-preforming tool now move towards each other (in the direction of the y axis) and deform the parison transversely, so giving it their own profile.

The transverse preforming tool is provided, on one of its two parts (3") with a thin projecting lower lip (6, see FIG. 2a) which is advanced, along the full length of the parison and when the two parts (3' and 3") are at their closest approach to each other, between the parison and the conveyor belt. The preformed parison is therefore now held laterally by the two parts of the transverse preforming tool and supported underneath by the projecting lip. This step is illustrated in FIGS. 2 and 2a.

The transverse preforming tool supporting the preformed parison is then displaced laterally (in the direction of the y axis) and transfers the preform towards the moulding tool. This step is illustrated in FIG. 3.

When the preform is positioned vertically over the mould impression it is released, in this case by a retraction of the lip (6) by means of an appropriate mechanism not illustrated here. Given that the longitudinal profile of the preform matches the longitudinal profile of the transverse preforming tool, which is itself chosen to suit the longitudinal profile of the mould impression, the transverse preforming tool can come very close to the upper surface of the lower section (4) of the mould, permitting very precise and reproducible positioning of the preform in this section of the mould. The mould is then reclosed by the complementary section, and the moulding operation is performed.

What is claimed is:

1. A system for preforming an extruded plastics parison, comprising a conveyor belt which has a nonplanar surface and at least one transverse parison preforming tool; said tool being characterized in that it is nonplanar and conforms at least partly to the longitudinal profile of the conveyor belt.

2. A system for preforming an extruded plastics parison comprising a conveyor belt, which has a nonplanar surface and at least one transverse parison preforming tool, the transverse preforming tool comprising a clamp for transferring the parison to a molding tool and positioning it in the molding tool.

3. A method of preforming an extruded plastics parison, comprising a step of depositing the parison on a conveyor belt, which has a nonplanar surface, and a step of transverse preforming of the parison by means of at least one tool which is nonplanar and conforms at least partly to a longitudinal profile of the conveyor belt.

4. The method of manufacturing at least one article, comprising a step in which a plastics parison is extruded and a step in which the said parison is moulded, wherein it also comprises a preforming step according to claim 3.

5. The method according to claim 4, using either a plurality of preforming systems and one moulding tool, or one preforming system and a plurality of moulding tools, or a plurality of preforming systems and a plurality of moulding tools.

6. A method of manufacturing an article, comprising
   (a) first extruding a plastics parison; and then
   (b) a step for moulding the parison, comprising
       (i) depositing the parison on a conveyor belt which has a nonplanar surface;
       (ii) transferring the parison to the moulding tool; and
       (iii) positioning the parison therein by the aid of a transverse preforming tool.

7. A method of manufacturing an article, comprising
   (a) extruding a plastics parison; and then
   (b) a step for moulding the parison, comprising;
       depositing the parison on a conveyor belt, which has a nonplanar surface; wherein the article is a filling sleeve for a fuel tank.

8. A system according to claim 1, in which the transverse preforming tool also constitutes a clamp for transferring the parison to and positioning it in a moulding tool.

* * * * *